Nov. 12, 1935.  J. W. HENNINGER  2,020,781
TIRE CHANGING TOOL
Filed Jan. 25, 1935
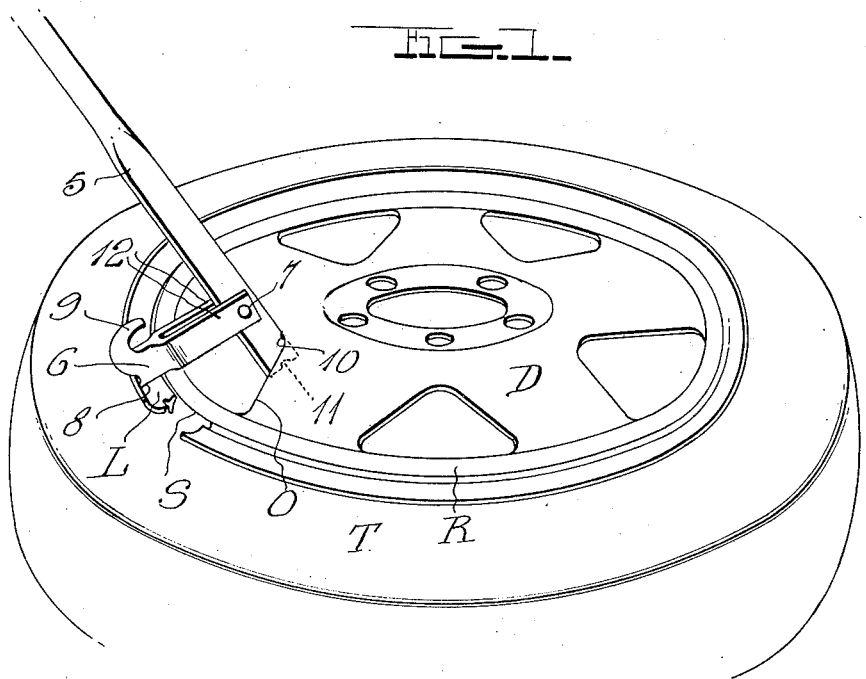
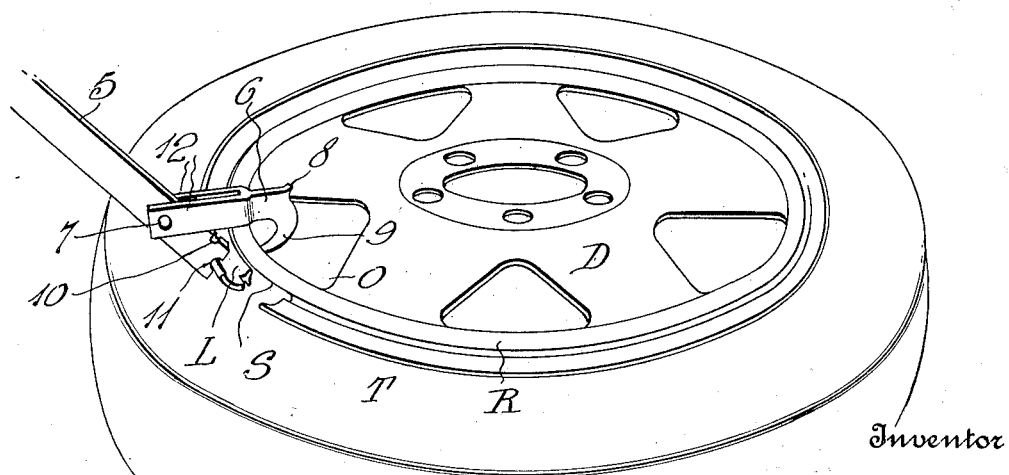

Patented Nov. 12, 1935

2,020,781

UNITED STATES PATENT OFFICE 2,020,781

TIRE CHANGING TOOL

James W. Henninger, El Paso, Tex.

Application January 25, 1935, Serial No. 3,521

2 Claims. (Cl. 157—6)

The invention relates to a new and improved tool for use in changing the pneumatic tires of disk wheels, particularly truck and buss wheels. One of the most common types of buss and truck wheels is of the disk type with a number of openings near the rim so that the disk portions between the openings simulate spokes, and this type of wheel is provided with a removable bead-engaging lock ring engaged normally with a seat in the rim for holding the tire upon said rim. This lock ring must be removed before one tire can be taken from the rim and another applied, and a great deal of difficulty is commonly encountered in connection with removing and replacing said ring. The present invention, however, aims to provide an exceptionally simple and inexpensive yet an efficient, rapid and easily operable tool designed for use upon wheels of the type set forth and capable of convenient use to either remove or re-apply the lock ring.

With the foregoing in view, the invention resides in the novel subject matter hereinafter described and claimed, description being accomplished by reference to the accompanying drawing.

Fig. 1 is a perspective view showing the manner of using the tool to remove the lock ring from its seat.

Fig. 2 is a view similar to Fig. 1 but showing the manner of using the tool to return the lock ring to its seat.

A disk wheel D is shown having the usual transversely split lock ring L engaged with a seat S for holding the tire T on the rim R. The disk D is formed with substantially triangular openings O between its hub and peripheral portions and one of these openings is located near the ends of the lock ring L. The tool constituting this invention is engaged with the inner end of this particular opening when removing the lock ring as seen in Fig. 1, and is engaged with the outer end of said opening when re-applying said lock ring as illustrated in Fig. 2.

The tool comprises a hand lever 5 and an arm 6 pivoted at 7 to said hand lever near one end of the latter, said arm being swingable in opposite directions from said lever. The free end of the arm 6 is provided with a sharp chisel-like thrust nose 8 to engage the flange of the lock ring L when said arm 6 is swung in one direction from the hand lever 5 as seen in Fig. 1, the tool being then usable to remove said lock ring from its seat. The free end of the arm 6 is provided also with an anchoring hook 9 for reception in the outer end of the opening O when said arm 6 is swung in the other direction from the lever 5, as seen in Fig. 2, the tool being then operable to return the lock ring L to its seat S.

The lever 5 is formed with a fulcrum seat 10 to engage the inner end of the opening O when the nose 8 is engaged with the lock ring L as seen in Fig. 1, so that outward swinging of said lever will then cause the arm 6 to radially force said lock ring from its seat. The lever 5 is provided with another seat 11 to engage the lock ring L when the tool is anchored by means of the hook 9 as seen in Fig. 2, so that outward swinging of said lever 5 will inwardly force said lock ring again into its seat S. The seats 10 and 11 are preferably in the form of notches, one of which opens laterally with respect to the length of the lever 5 and the other of which opens through the end of the lever to which the arm 6 is pivoted. The inner end of this arm is preferably bifurcated, its furcations 12 straddle the lever 5, and the pivot 7 passes through said furcations and lever. The portion of the lever to which the arm 6 is pivoted is preferably flat but I prefer that the part of said lever gripped by the user's hands in operation of the tool, be cylindrical or substantially so.

It will be seen from the foregoing that an exceptionally simple and inexpensive tool has been provided for carrying out the object of the invention, and particular attention is invited to the fact that there are no parts provided requiring adjustment to condition the tool for one use or the other. By simply swinging the arm 6 in one direction from the lever 5, the tool is in readiness for removing the lock ring and in order to condition said tool for re-applying said ring, it is only necessary to swing said arm in the opposite direction.

The details disclosed may be considered as preferred but within the scope of the invention as claimed, variations may be made.

I claim:

1. A tire changing tool for a disk wheel having a split lock ring, the disk of said wheel having an opening near the ends of said ring; said tool comprising a hand lever and an arm pivoted to said hand lever near one end of the latter to swing in opposite directions from said lever, said arm having a thrust nose to abut said lock ring when said arm is swung in one direction from said lever and having an anchoring hook for reception in said opening when said arm is swung in the other direction from said lever;

said lever being constructed to fulcrum against the inner end of said opening when said thrust nose is engaged with said ring and to engage said ring when said arm is anchored by means of said hook, whereby in the first instance operation of the lever will force said ring from its seat, and in the second instance operation of said lever will return said ring to its seat.

2. A tire changing tool for a disk wheel having a split lock ring, the disk of said wheel having an opening near the ends of said ring; said tool comprising a hand lever and an arm pivoted to said hand lever near one end of the latter to swing in opposite directions from said lever, said arm having a thrust nose to abut said lock ring when said arm is swung in one direction from said lever and having an anchoring hook for reception in said opening when said arm is swung in the other direction from said lever; said lever having a fulcrum seat to engage the inner end of said opening when said thrust nose is engaged with said ring, whereby operation of said lever will force said ring from its seat, said lever having a second seat to engage said ring and return the latter to its seat when said lever is operated while said arm is anchored by means of said hook.

JAMES W. HENNINGER.